United States Patent
Shu et al.

(10) Patent No.: US 8,417,254 B2
(45) Date of Patent: Apr. 9, 2013

(54) SYSTEMS AND METHODS FOR MULTIPLE RADIO ACCESS BEARIER TRAFFIC THROTTLING

(75) Inventors: Haw-Wei Shu, Taoyuan County (TW); Te-Chin Chang, Taoyuan County (TW); Chien-Jen Huang, Taoyuan County (TT); Chih-Hsin Hsu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 0 days.

(21) Appl. No.: 13/553,355

(22) Filed: Jul. 19, 2012

(65) Prior Publication Data

US 2013/0023260 A1    Jan. 24, 2013

Related U.S. Application Data

(60) Provisional application No. 61/509,587, filed on Jul. 20, 2011.

(51) Int. Cl.
*H04W 72/00* (2009.01)

(52) U.S. Cl. ........................................ 455/450; 707/792

(58) Field of Classification Search ................. 455/450, 455/418, 435.1, 90.2; 707/792, 802; 370/329; 379/88.13
See application file for complete search history.

(56) References Cited

U.S. PATENT DOCUMENTS

| | | | |
|---|---|---|---|
| 7,716,247 B2 * | 5/2010 | Brjazovski et al. | 707/792 |
| 2009/0141631 A1 | 6/2009 | Kim et al. | |
| 2012/0009930 A1 * | 1/2012 | Brisebois et al. | 455/450 |

FOREIGN PATENT DOCUMENTS

| | | |
|---|---|---|
| EP | 1 173 035 A1 | 1/2002 |
| WO | 2009/024910 A2 | 2/2009 |
| WO | 2009/024910 A3 | 2/2009 |

OTHER PUBLICATIONS

European Search Report issued Jan. 17, 2013.

* cited by examiner

*Primary Examiner* — Phuoc Doan
(74) *Attorney, Agent, or Firm* — McClure, Qualey & Rodack, LLP

(57) ABSTRACT

Various embodiments for data throttling are disclosed. One embodiment is a method performed by a mobile device for managing a voice call. The method comprises determining a voice call status. Based on the voice call status, a determination is made on whether at least one application executing on the mobile device is concurrently accessing data via the mobile device during an active call. In response to the occurrence of an active call and concurrent data access by the mobile device, the data access mode used by the mobile device for accessing the data is determined. Based on the determined data mode, data access by the at least one application is suppressed.

20 Claims, 6 Drawing Sheets

SYSTEMS AND METHODS FOR MULTIPLE RADIO ACCESS BEARIER TRAFFIC THROTTLING

CROSS-REFERENCE TO RELATED APPLICATION

This application claims priority to, and the benefit of, U.S. Provisional Patent Application entitled, "Multi-RAB Traffic Throttling," having Ser. No. 61/509,587, filed on Jul. 20, 2011, which is incorporated by reference in its entirety.

BACKGROUND

With the rapid development in communications technology, mobile devices have become an integral part of many people's lives given the portability and the growing number of applications available on mobile devices. Today, individuals can perform a wide range of functions such as e-mail communications, web surfing, electronic commerce, etc. via mobile devices. Furthermore, with the wide popularity of social networking, communities of users stay connected through the Internet. With a mobile device equipped with both voice and data capabilities, it is common for the user to utilize the voice channel to conduct a phone call while at the same time, utilizing the data bearer via one or more applications to access data. These are known as multiple radio access bearer (mRAB) calls, which can introduce a higher probability of dropped calls.

SUMMARY

Briefly described, one embodiment, among others, is a method performed by a mobile device for managing a voice call. The method comprises determining a voice call status. Based on the voice call status, a determination is made on whether at least one application executing on the mobile device is concurrently accessing data via the mobile device during an active call. In response to the occurrence of an active call and concurrent data access by the mobile device, the data access mode used by the mobile device for accessing the data is determined. Based on the determined data mode, data access by the at least one application is suppressed.

Another embodiment is a system for managing a voice call on a mobile device that comprises a call status module configured to determine a voice call status on the mobile device and a data monitor configured to determine whether at least one application executing on the mobile device is concurrently accessing data via the mobile device during an active call, wherein the data monitor is further configured to determine a data access mode used by the mobile device for accessing the data responsive to the occurrence of an active call and concurrent data access by the mobile device. The system further comprises a data throttling module configured to suppress data access by the at least one application executing on the mobile device based on a trigger criteria corresponding to the determined data access mode.

Another embodiment is a method performed by user equipment (UE) for managing a voice call. The method comprises determining a voice call status. Based on the voice call status, a determination is made on whether at least one application executing on the UE is concurrently accessing data via the UE during an active call. In response to the occurrence of an active call and concurrent data access by the UE, a data access mode used by the UE for accessing the data is determined. Data access by the at least one application executing on the UE is suppressed based on a trigger criteria corresponding to the determined data access mode.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

With a mobile device equipped with both voice and data capabilities, it is common for the user to utilize the voice channel to conduct a phone call while at the same time, utilizing the data bearer via one or more applications to access data. These are known as multiple radio access bearer (mRAB) calls, which can introduce a higher probability of dropped calls. Disclosed are various embodiments for managing a voice call on such user equipment as a mobile device during mRAB sessions, whereby data throttling is performed based on various trigger conditions to reduce the probability of a dropped call. One embodiment, among others, is a method performed by a mobile device for managing a voice call. The method comprises determining a voice call status where based on the voice call status, a determination is made on whether at least one application executing on the mobile device is concurrently accessing data via the mobile device during an active call. In response to the occurrence of an active call and concurrent data access by the mobile device, the data access mode used by the mobile device for accessing the data is determined. Based on the determined data access mode, data access by the at least one application is suppressed. In the following discussion, a general description of a system and its components for performing data throttling is provided, followed by a discussion of the operation of the same.

Figure 1:
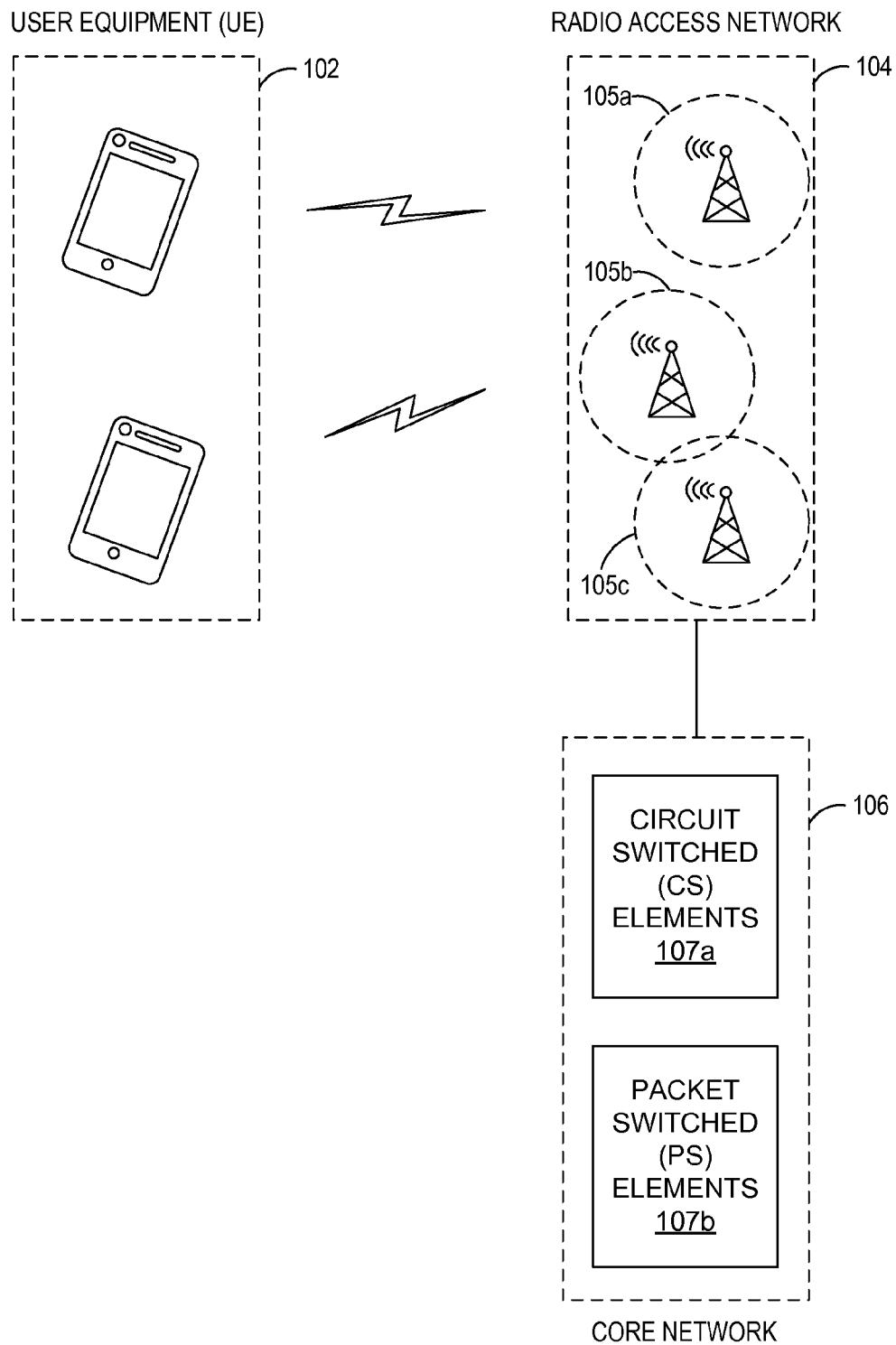
FIG. 1 is a block diagram of a networked environment in which embodiments for facilitating data throttling may be implemented in accordance with various embodiments.

FIG. 1 is a block diagram of a networked environment in which embodiments for facilitating data throttling may be implemented in accordance with various embodiments. The network includes user equipment (UE) 102, which may be embodied, for example, as a smartphone, tablet, or other computing devices with integrated communications capabilities. As shown, the network further comprises a radio access network 104 and a core network 106. The UE 102 interfaces with the radio access network 104 via a wireless radio link, where the UE 102 interface of the radio access network 104 includes RRC (Radio Resource Control), RLC (Radio Link Control) and MAC (Media Access Control) protocols. The RRC protocol handles connection establishment, measurements, radio bearer services, security, and handover decisions.

The radio access network 104 includes various base stations 105a, 105b, 105c that provide cellular service across various cell coverage areas. The cellular service may include second, third, fourth generation telecommunication systems such as Global System for Mobile communications (GSM) system, Universal Mobile Telecommunications System (UMTS), and Long Term Evolution (LTE) system, and so on. The base stations 105a, 105b, 105c may be coupled to corresponding base station controllers (not shown) that control operation of the base stations 105a, 105b, 105c and provide access to the core network 106. In a UMTS architecture, the base station controllers may be implemented as radio network controllers in the UMTS terrestrial radio access network (UTRAN).

The core network 106 provides various services to the UE 102 via access networks and provides all the central processing and management for the network. The core network 106 is connected to such networks as the Public Switched Telephone Network (PSTN), the Internet, and so on. The core network 106 may comprise circuit switched (CS) elements 107a that operate in the CS domain and packet switched (PS) elements 107b that operate in the PS domain. CS elements 107a are primarily based on the Global System for Mobile Communications (GSM) network entities and carry data in a circuit switched manner where a dedicated channel is established for the duration of a voice call.

PS elements 107b provide data services for the UE 102 and are configured to carry packet data. This enables much higher network usage as the capacity can be shared and data is carried as packets which are routed according to their destination. PS elements 107b include such network entities as a Serving GPRS Support Node (SGSN) and a Gateway GPRS Support Node (GGSN). The SGSN performs such functions as mobility and session management. The GGSN handles inter-working between the UMTS packet switched network and external packet switched networks.

Figure 2:
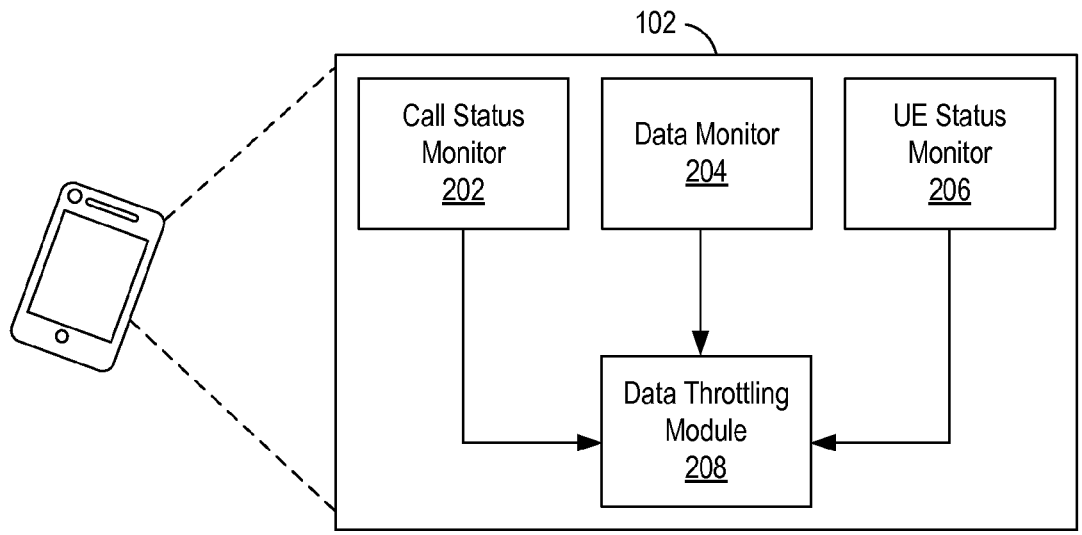
FIG. 2 illustrates various components of the user equipment in FIG. 1 for facilitating data throttling according to an embodiment of the present disclosure.

With reference to FIG. 2, shown are various components of the UE 102 in FIG. 1 according to an embodiment of the present disclosure. The UE 102 is configured to perform data throttling to reduce the probability of a dropped call. Specifically, applications, logic, and/or other functionality may be executed in the UE 102 to facilitate data throttling during mRAB sessions. In accordance with various embodiments, the UE 102 includes a call status monitor 202 configured to determine a voice call status of the UE 102. For example, the call status monitor 202 may be configured to monitor whether a UMTS voice call is taking place on the UE 102 where the call may comprise an incoming call or an outgoing call originated by a user of the UE 102.

The UE 102 also includes a data monitor 204 configured to determine whether at least one application executing on the UE 102 is concurrently accessing data via the UE 102 during an active call. For example, the data monitor 204 may determine whether such applications as an e-mail client, a browser, a media player, a social networking application, a weather application, etc. executing on the UE 102 is attempting to retrieve data from the network while an active call is taking place. More specifically, the data monitor 204 may be configured to determine whether at least one application executing on the UE 102 is concurrently utilizing a PS element 107b (FIG. 1) in the core network 106 (FIG. 1) during a voice call.

The data monitor 204 may be further configured to determine a data access mode used by the UE 102 for accessing the data where this determination is made in response to both the occurrence of an active call and concurrent data access by the UE 102. For example, the data monitor 204 may be configured to determine whether the UE 102 is attempting to access data via cellular communications versus IEEE 802.11 based communications where the UE 102 is connected to a wireless network. As another example, the data monitor 204 may be configured to determine whether the UE 102 is currently configured as a wireless hotspot or whether another device is tethered to the UE 102 via a wired connection to access data via the UE 102.

The data monitor 204 may also be configured to monitor for Multimedia Messaging Service (MMS) communications by the UE 102 for receiving or transmitting data, or cellular communications for data access for providing assisted Global Positioning System (aGPS) functionality by the UE 102. In accordance with various embodiments, data throttling is enabled based on a priority level of the data access mode. In some embodiments, data throttling is enabled only when no higher priority tasks are taking place. For example, when the UE 102 is configured for Internet sharing with another device, data throttling is not enabled so that service to the other device is not disrupted. In this regard, various tasks related to accessing data may be designated as higher priority tasks whereby data throttling is disabled if one or more of these tasks are currently taking place on the UE 102.

The UE 102 further comprises a UE status monitor 206 configured to monitor a current operational state of the UE 102. In order to seamlessly throttle data without the user of the UE 102 being aware of the throttling process, the UE status monitor 206 may monitor the current operational state to determine whether the display of the UE 102 is inactive, thereby providing one indication that the user is not currently interacting with the UE 102 to access data (i.e., the data access is being performed as a background task). In operation, the data throttling module 208 suppresses data access by the at least one application executing on the mobile device based on a trigger criterion corresponding to the determined data access mode. For some embodiments, the trigger criterion may correspond to the occurrence of data access by the mobile device via cellular communications other than MMS messaging and where the mobile device is not tethered to an external device or configured as a wireless hotspot. The trigger criterion may further correspond to the display of the UE 102 being inactive for a predetermined period of time.

Figure 3:
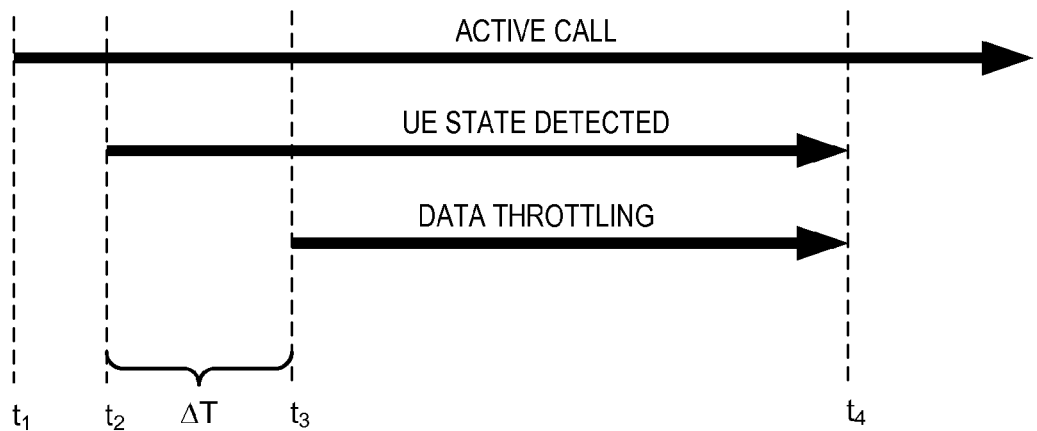
FIG. 3 illustrates the timing of events associated with data throttling performed by the user equipment of FIG. 1 in accordance with various embodiments.

FIG. 3 illustrates the timing of events associated with data throttling in accordance with various embodiments. At time t1, a voice call is initiated whereby the call may be one initiated by the UE 102 (FIG. 1) or one initiated from another device and received at the UE 102 (i.e., an incoming call). The call is detected by the call status monitor 202 (FIG. 2). Based on the detection of a voice call, the data monitor 204 (FIG. 2) determines whether any applications executing on the UE 102 is accessing data.

At time t2, the UE status monitor 206 (FIG. 2) determines the current state of the UE 102. For example, the UE status monitor 206 may be configured to determine whether the display of the UE 102 is currently inactive, thereby indicating that the user of the UE 102 is not currently interacting with the UE 102. In operation, the data monitor 204 determines whether any higher priority tasks are taking place on the UE 102, where higher priority tasks may comprise, for example, use of the UE 102 as a hotspot where other devices are accessing the Internet via a wireless connection to the UE 102. Other higher priority tasks may comprise use of the UE 102 to access the Internet by other devices coupled to the UE 102 via a wired connection (e.g., where other devices are tethered to the UE 102 via a Universal Serial Bus (USB) cable). Other high priority tasks may comprise an active MMS communication session or cellular data access by the UE 102 for performing aGPS functionality. Based on the absence of one or more high priority tasks, the UE status monitor 206 may determine that a trigger condition has occurred.

At time t3, the data throttling module 208 (FIG. 2) initiates data throttling/suppression to reduce the probability of a dropped call during an mRAB session. Note that for the embodiment shown, the data throttling module 208 initiates data throttling after a delay ($\Delta T$). This delay in executing data throttling is implemented in order to avoid a ping pong effect where data throttling is enabled/disabled within a short period of time. The delay in executing data throttling may be configurable and may be implemented via a hysteresis timer (not shown) in the UE 102. In one embodiment, data throttling is enabled when an active call, concurrent data access, and inactivity of the display of the UE 102 all occur for at least a predetermined period of time (e.g. $\Delta T$). In this embodiment, one additional limitation may be that the concurrent data access not involve one of the higher priority tasks mentioned above in order for data throttling to be enabled.

While data throttling is enabled, the call status monitor 202, the data monitor 204, and the UE status monitor 206 continue to monitor the status of the UE 102. Once the trigger condition no longer applies, the data throttling module 208 may be configured to terminate data throttling after another short delay (e.g., $\Delta T$). At time t4, the UE status monitor 206 determines that the trigger criteria for throttling data no longer apply. Based on this determination, the data throttling module 208 terminates data throttling.

In accordance with various embodiments, data throttling performed by the data throttling module 208 may comprise throttling of data in the uplink direction and/or the downlink direction. Where data throttling/suppression is performed in the uplink direction, suppressing data may comprise suppressing data requests from the UE 102 at the application layer such that the one or more applications executing on the UE 102 is aware of the data suppression.

Figure 4:
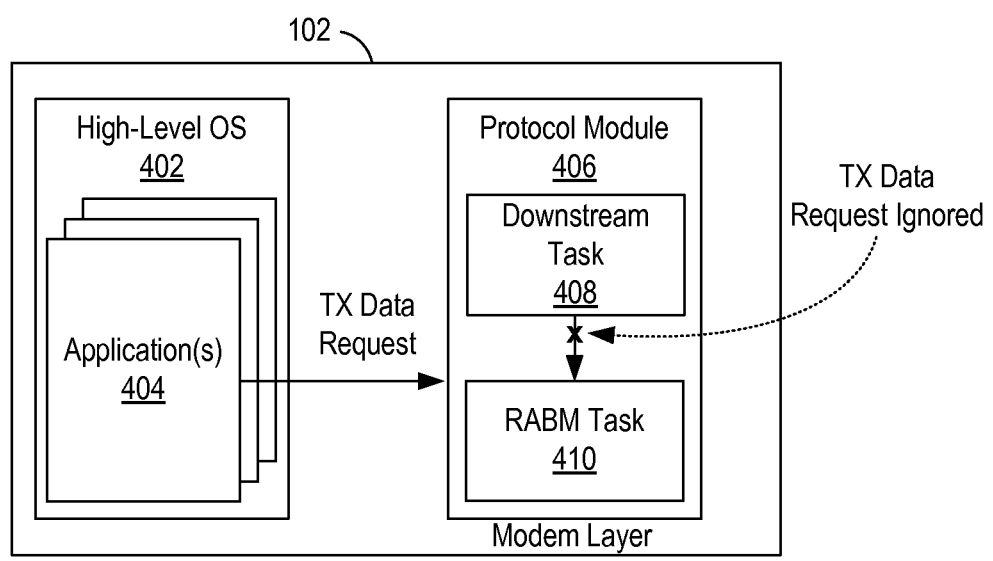
FIG. 4 illustrates suppression of a transmit data request from applications executing in a high-level operating system (HLOS) of the user equipment of FIG. 1 where suppression is performed by a protocol module with the modem layer in accordance with various embodiments.

In accordance with other embodiments, suppressing data may comprise suppressing data transmission from the UE 102 at one or more layers below the application layer such that the one or more applications executing on the UE 102 are unaware of the data suppression. Reference is made to FIG. 4, which illustrates suppression of a transmit data request from applications 404 executing in a high-level operating system (HLOS) 402 where suppression is performed by a protocol module 406 within the modem layer.

In accordance with various embodiments, data suppression may be performed at such layers as the modem layer, the input/output (IO) layer, the middleware layer (or the framework layer), and the radio interface layer. As shown, transmit data requests and/or associated transmit data originating in the applications 404 executing in the HLOS 402 are ignored or rejected in the path between downstream tasks 408 and Radio Access Bearer Module (RABM) tasks 410. In accordance with such embodiments, no Internet Protocol (IP) indication is provided to the applications 404 regarding the ignored transmit data request. Furthermore, no packet switched data service indicator or Transmission Control Protocol (TCP) session indicator is provided to the applications 404.

Where data suppression is performed by the data throttling module 208 (FIG. 2) in the downlink direction, the data throttling module 208 may be configured to either maintain any active IP connection or release any active IP connection during the data throttling operation. Where the data throttling module 208 maintains any active IP connection that currently exists, the data throttling module 208 may be configured to block the downloading of data for use in one or more applications executing on the mobile device. The blocking operation may comprise, for example, releasing radio network resource corresponding to a packet switched (PS) service utilized for accessing the data. Specifically, the data throttling module 208 may be configured to issue a Signaling Connection Release Indication (SCRI) to release PS Radio Access Bearer (RAB) resources. The blocking operation may further comprise ignoring or rejecting radio resource allocation corresponding to a packet switched (PS) service utilized for accessing the data.

For example, the data throttling module 208 may be configured to ignore or reject any channel resource allocation originating from a base station 105a, 105b, 105c (FIG. 1) or network controller within, for example and without limitation, a Universal Mobile Telecommunications System (UMTS), Wideband Code Division Multiple Access (WCDMA), High-Speed Downlink Packet Access (HSDPA), High-Speed Uplink Packet Access (HSUPA), High Speed Packet Access (HSPA), or HSPA+ network. The data throttling module 208 may also be configured to suppress data access by ignoring or rejecting PS-related paging messages issued from the network. For implementations where IP connections are maintained during data throttling, the data connection is released via a TCP/IP session release command. Furthermore, any applications executing on the UE 102 requesting data access are placed in offline mode.

For implementations where active IP connections are released during the data throttling operation, the Packet data protocol (PDP) Context is deactivated during data throttling. The PDP context contains routing information for packet transfer between a mobile station and a GGSN (Gateway GPRS Support Node) to have access to an external packet-switching network. Once data throttling is terminated, the PDP Context is reactivated.

In one embodiment, the data throttling module 208 is configured to suppress data access by first releasing radio network resource corresponding to a packet switched (PS) service used by one or more applications 404 executing on the UE 102. Current PS data access by one or more applications 404 can therefore be suppressed. Then, the data throttling module 208 performs one or both of uplink (UL) data suppression and downlink (DL) data suppression. The UL data suppression is performed to suppress new subsequent PS data transmission from the UE 102, and the DL data suppression is performed to suppress subsequent new PS data reception by the UE 102, e.g., the DL data suppression may comprise ignoring or rejecting radio resource allocation utilized for the subsequent new PS data reception. Thus, subsequent new data transmission/reception by the UE 102 can also be suppressed.

Figure 5:
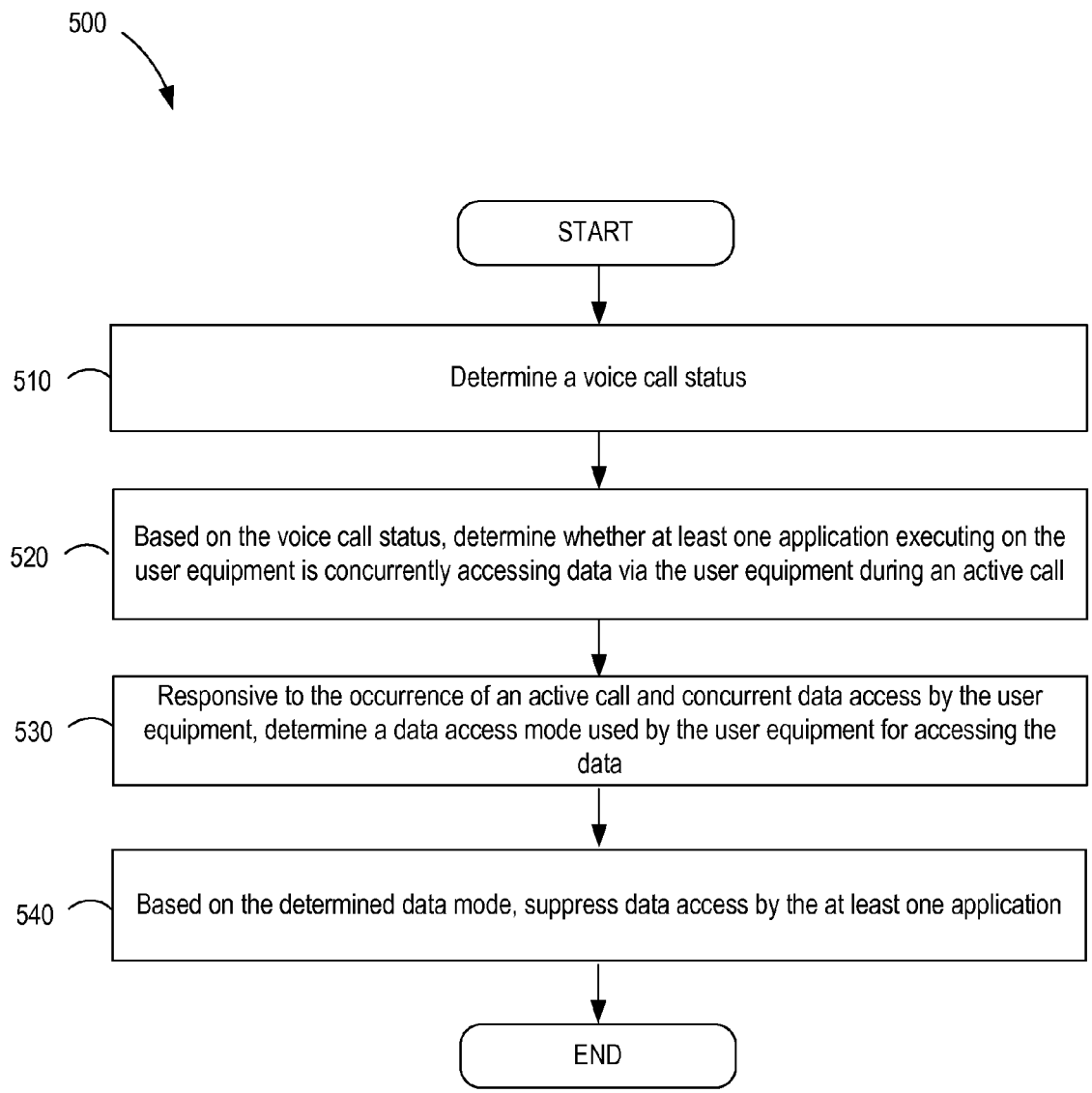
FIG. 5 is a top-level flowchart illustrating examples of functionality implemented as portions of the user equipment of FIG. 1 for facilitating data throttling according to various embodiments of the present disclosure.

Reference is made to FIG. 5, which is a flowchart 500 in accordance with one embodiment for facilitating data throttling in order to reduce the probability of dropped calls during mRAB sessions performed by the user equipment (UE) 102 (FIG. 1). It is understood that the flowchart 500 of FIG. 5 provides merely an example of the many different types of functional arrangements that may be employed. As an alternative, the flowchart of FIG. 5 may be viewed as depicting an example of steps of a method implemented in the UE 102 according to one or more embodiments.

In block 510, a voice call status of the UE 102 is determined. In particular, the call status monitor 202 (FIG. 2) executing in the UE 102 determines whether a UMTS voice call is taking place on the UE 102 where the call may comprise an incoming call or an outgoing call originated by a user of the UE 102.

In block 520, the data monitor 204 (FIG. 2) determines whether at least one application 404 (FIG. 4) executing on the UE 102 is concurrently accessing data via the UE 102 during an active call where the determination is performed based on the voice call status determined by the call status monitor 202.

In block 530, in response to the occurrence of an active call and concurrent data access by the UE 102, the data monitor 204 determines a data access mode used by the UE 102 for accessing the data. In particular, the data monitor 204 may determine whether the UE 102 is accessing data via a higher priority task. For example, the data monitor 204 may be configured to determine whether the UE 102 is currently configured as a wireless hotspot or whether the UE 102 is connected to another device via a USB cable to provide data access for the device. The data monitor 204 may also be configured to monitor for Multimedia Messaging Service (MMS) communications for accessing the data. In accordance with various embodiments, data throttling is enabled only when no higher priority tasks are taking place. For example, when the UE 102 is configured for Internet sharing with another device, data throttling is not enabled so that service to the other device is not disrupted.

In block 540, the data throttling module 208 (FIG. 2) suppresses data access by the at least one application 404 based on the determined data mode.

Figure 6:
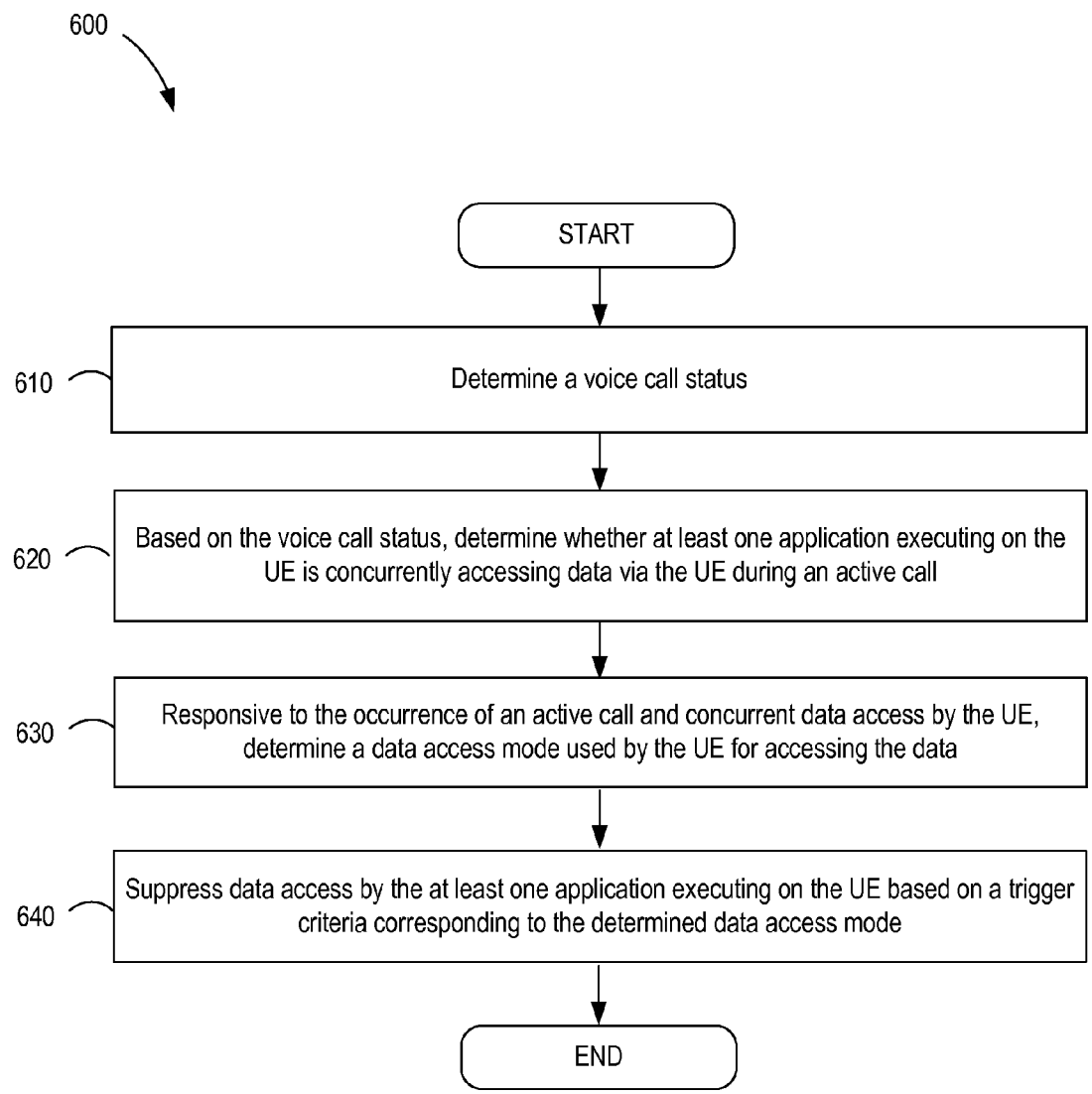
FIG. 6 is a top-level flowchart illustrating examples of functionality implemented as portions of the user equipment of FIG. 1 for facilitating data throttling according to an alternative embodiment of the present disclosure.

Reference is made to FIG. 6, which is a flowchart 600 in accordance with an alternative embodiment for facilitating data throttling in order to reduce the probability of dropped calls during mRAB sessions performed by the UE 102 (FIG. 1). It is understood that the flowchart 600 of FIG. 6 provides merely an example of the many different types of functional arrangements that may be employed. As an alternative, the flowchart of FIG. 6 may be viewed as depicting an example of steps of a method implemented in the UE 102 according to one or more embodiments.

In block 610, a voice call status of the UE 102 is determined. In particular, the call status monitor 202 (FIG. 2) executing in the UE 102 determines whether a UMTS voice call is taking place on the UE 102 where the call may comprise an incoming call or an outgoing call originated by a user of the UE 102.

In block 620, the data monitor 204 (FIG. 2) determines whether at least one application 404 (FIG. 4) executing on the UE 102 is concurrently accessing data via the UE 102 during an active call where the determination is based on the voice call status determined by the call status monitor 202. In block 630, in response to the occurrence of an active call and concurrent data access by the UE 102, the data monitor 204 further determines a data access mode used by the UE 102 for accessing the data.

In block 640, the data throttling module 208 (FIG. 2) suppresses data access by the at least one application 404 executing on the mobile device based on a trigger criterion corresponding to the determined data access mode. In accordance with some embodiments, data throttling/suppression by the data throttling module 208 may comprise uplink (UL) data suppression and/or downlink (DL) data suppression. In accordance with some embodiments, the data throttling module 208 suppresses data access by the at least one application 404 by ignoring or rejecting radio resource allocation corresponding to packet switched (PS) service for the at least one application 404 executing on the UE 102. For DL data suppression, the data throttling module 208 may transmit a signaling connection release indication (SCRI) message to a wireless network providing a PS service to the UE 102.

Figure 7:
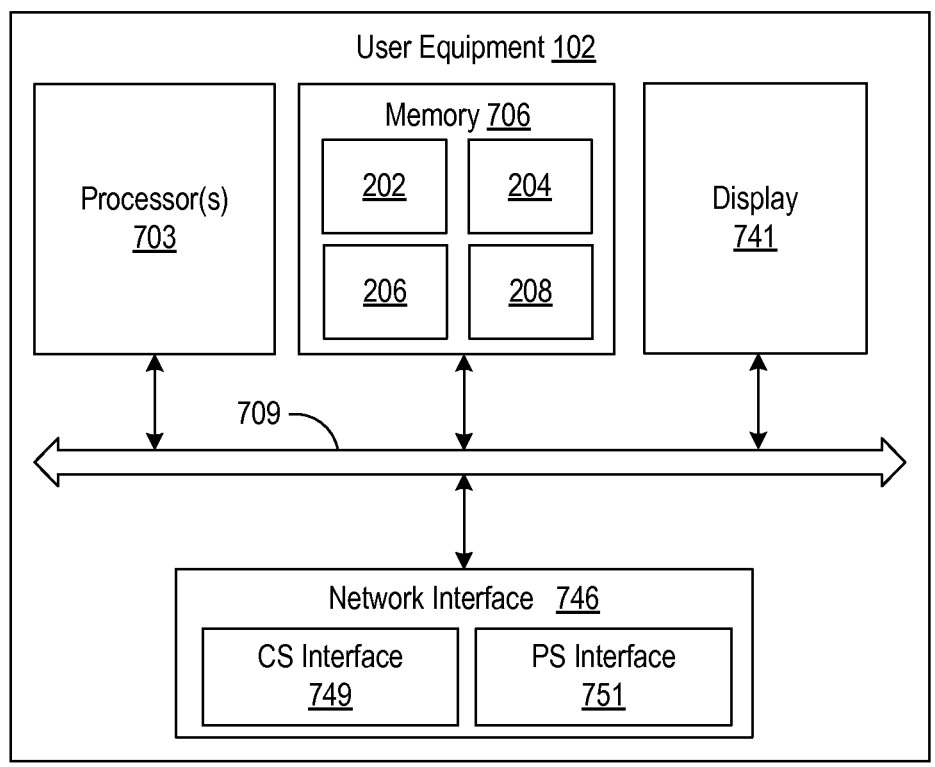
FIG. 7 is a schematic block diagram of the user equipment in FIG. 1 according to an embodiment of the present disclosure.

With reference to FIG. 7, shown is a schematic block diagram of the UE 102 in which data throttling is implemented according to an embodiment of the present disclosure. The UE 102 includes at least one processor 703 and a memory 706, both of which are coupled to a local interface 709. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the call status monitor 202, data monitor 204, UE status monitor 206, data throttling module 208, and potentially other applications. In addition, an operating system may be stored in the memory 706 and executable by the processor 703. The UE 102 also includes a display 741 such as a touchscreen display.

The network interface 746 comprises various components used to transmit and/or receive data over a network environment. By way of example, the network interface 746 may include a device that can communicate with both inputs and outputs, for instance, a radio modem interface, wireless (e.g., radio frequency (RF), IEEE 802.11 based communications) transceiver, a telephonic interface, a bridge, a router, network card, and so on. The network interface 746 further comprises a circuit switched (CS) interface 749 and a packet switched (PS) interface 751 for communicating with the CS elements 107a (FIG. 1) and the PS elements 107b (FIG. 1) in the core network 106 (FIG. 1) described earlier.

It is understood that there may be other applications that are stored in memory 706 and are executable by the processor 703 as can be appreciated. Where any component discussed herein is implemented in the form of software, any one of a number of programming languages may be employed. A number of software components are stored in memory 706 and are executable by the processor 703. In this respect, the term executable means a program file that is in a form that can ultimately be run by the processor 703. Examples of executable programs may be, for example, a compiled program that can be translated into machine code in a format that can be loaded into a random access portion of memory 706 and run by the processor 703, source code that may be expressed in proper format such as object code that is capable of being loaded into a random access portion of memory 706 and executed by the processor 703, or source code that may be interpreted by another executable program to generate instructions in a random access portion of memory 706 to be executed by the processor 703, etc.

An executable program may be stored in any portion or component of memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, memory 706 may comprise, for example, random access memory (RAM), read-only memory (ROM), hard disk drives, solid-state drives, USB flash drives, memory cards accessed via a memory card reader, and/or other memory components, or a combination of any two or more of these memory components.

In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

The processor 703 may represent multiple processors and memory 706 may represent multiple memories that operate in parallel processing circuits, respectively. In such a case, the local interface 709 may be an appropriate network that facilitates communication between any two of the multiple processors, between any processor and any of the multiple memories, or between any two memories, etc. Such a local interface 709 may comprise additional systems designed to coordinate this communication, including, for example, performing load balancing. The processor 703 may be of electrical or of some other available construction.

Although the components and applications described herein may be embodied in software or code executed by general purpose hardware as discussed above, as an alternative the same may also be embodied in dedicated hardware or a combination of software/general purpose hardware and dedicated hardware.

If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts 500, 600 of FIG. 5 and FIG. 6 show an example of functionality associated with implementation of the various components in the system of FIG. 1. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowcharts 500, 600 of FIG. 5 and FIG. 6 show a specific order of execution, it is understood that the order of execution may differ from that which is depicted. For example, the order of execution of two or more blocks may be scrambled relative to the order shown. Also, two or more blocks shown in succession in FIG. 5 and FIG. 6 may be executed concurrently or with partial concurrence. Furthermore, in some embodiments, one or more of the blocks shown in FIG. 5 and FIG. 6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that comprises software or code can be embodied in any non-transitory computer-readable medium for use by or in connection with an instruction execution system such as, for example, a processor in a computer system or other system. Each may comprise, for example, statements including instructions and declarations that can be fetched from the computer-readable medium and executed by the instruction execution system.

In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs.

Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A method performed by a mobile device for managing a voice call, comprising:
   determining a voice call status;
   based on the voice call status, determining whether at least one application executing on the mobile device is concurrently accessing data via the mobile device during an active call;
   responsive to the occurrence of an active call and concurrent data access by the mobile device, determining a data access mode used by the mobile device for accessing the data; and
   based on the determined data access mode, suppressing data access by the at least one application.

2. The method of claim 1, wherein the data access mode comprises one of:
cellular communications for accessing the data;
cellular communications for accessing the data for an external device via tethering of the external device to the mobile device;
cellular communications for accessing the data for an external device via configuration of the mobile device as a wireless hotspot;
cellular communications for accessing the data for the mobile device to perform assisted Global Positioning System (aGPS) functionality;
Multimedia Messaging Service (MMS) communications for accessing the data; and
IEEE 802.11 based communications for accessing the data.

3. The method of claim 2, wherein suppressing data access is performed based on a priority level of the data access mode.

4. The method of claim 2, wherein suppressing data access is performed only in response to the data access mode corresponding to cellular communications for accessing the data.

5. The method of claim 1, further comprising determining an operation status of the mobile device, wherein suppressing data access is performed responsive to the operation status of the mobile device.

6. The method of claim 5, wherein the operation status of the mobile device is corresponding to a display of the mobile device being inactive.

7. The method of claim 6, wherein suppressing data access is performed responsive to the display of the mobile device being inactive for a predetermined period of time.

8. The method of claim 1, wherein suppressing data access comprises releasing radio network resource corresponding to a packet switched (PS) service utilized for accessing the data.

9. The method of claim 1, wherein suppressing data access comprises suppressing data requests from the mobile device at an application layer.

10. The method of claim 1, wherein suppressing data access comprises suppressing data transmission at one or more layers of the mobile device, wherein the one or more layers comprise one or more of:
a modem layer;
an input/output (IO) layer;
a middleware layer; and
a radio interface layer.

11. The method of claim 1, wherein suppressing data access comprises blocking the downloading of data for use in the at least one application executing on the mobile device.

12. The method of claim 11, wherein blocking the downloading of data further comprises ignoring or rejecting radio resource allocation corresponding to a packet switched (PS) service utilized for accessing the data.

13. The method of claim 1, further comprising resuming data access by the at least one application upon termination of the active call.

14. A system for managing a voice call on a mobile device, comprising:
a call status monitor configured to determine a voice call status on the mobile device;
a data monitor configured to determine whether at least one application executing on the mobile device is concurrently accessing data via the mobile device during an active call, wherein the data monitor is further configured to determine a data access mode used by the mobile device for accessing the data responsive to the occurrence of an active call and concurrent data access by the mobile device; and
a data throttling module configured to suppress data access by the at least one application executing on the mobile device based on a trigger criterion corresponding to the determined data access mode.

15. The system of claim 14, wherein the trigger criterion comprises the determined data access mode corresponding to cellular communications for accessing the data and not corresponding to one of:
cellular communications for accessing the data for an external device via tethering of the external device to the mobile device;
cellular communications for accessing the data for an external device via configuration of the mobile device as a wireless hotspot;
cellular communications for accessing the data for the mobile device to perform assisted Global Positioning System (aGPS) functionality; and
Multimedia Messaging Service (MMS) communications for accessing the data.

16. The system of claim 14, wherein the trigger criterion further comprises a display of the mobile device being inactive for a predetermined period of time.

17. A method performed by a user equipment (UE) for managing a voice call, comprising:
determining a voice call status;
based on the voice call status, determining whether at least one application executing on the UE is concurrently accessing data via the UE during an active call;
responsive to the occurrence of an active call and concurrent data access by the UE, determining a data access mode used by the UE for accessing the data; and
suppressing data access by the at least one application executing on the UE based on a trigger criterion corresponding to the determined data access mode.

18. The method of claim 17, wherein suppressing data access by the at least one application comprises releasing radio network resource corresponding to a packet switched (PS) service used by the at least one application executing on the UE.

19. The method of claim 18, wherein suppressing data access by the at least one application comprises:
after releasing the radio network resource corresponding to the PS service used by the at least one application, performing one or more of:
uplink (UL) data suppression to suppress subsequent new PS data transmission from the mobile device; and
downlink (DL) data suppression to suppress subsequent new PS data reception by the mobile device.

20. The method of claim 19, wherein the DL data suppression comprises ignoring or rejecting radio resource allocation utilized for the subsequent new PS data reception.

* * * * *